United States Patent Office 3,268,464
Patented August 23, 1966

3,268,464
COMPOSITIONS OF OLEFIN OXIDE POLYMERS AND ROSINOUS MATERIALS
John F. Suter, Charleston, W. Va., assignor to Union Carbide Corporation, a corporation of New York
No Drawing. Filed July 7, 1961, Ser. No. 122,400
7 Claims. (Cl. 260—24)

This invention relates, in general, to olefin oxide polymers. In one aspect, this invention is directed to compositions of olefin oxide polymers and rosinous materials.

This application is a continuation-in-part of an application entitled, "Surface Treated Olefin Oxide Polymers," Serial No. 62,838, filed October 17, 1960, now abandoned.

A recent, outstanding development in the chemical art has been the expansion and growth in the use of water-soluble polymers. The water-soluble feature provides a convenient and inexpensive means for handling the polymers and also provides a variety of unique applications not heretofore possible. For example, water-soluble polymers have been employed as binders, thickeners, water-soluble films, and the like. More recently, water-soluble resins prepared by the polymerization of lower alkylene oxides, such as ethylene oxide, to polymeric compounds having molecular weights in the range of from about one hundred thousand to about ten million, and higher, are showing remarkable promise in this area. Their water-solubility renders them suitable for numerous uses, such as textile warp sizing, coagulation of various slurries, adhesives, and the like.

Notwithstanding the numerous, distinctive properties which characterize the olefin oxide polymers and products prepared therefrom, several features either limit their use or render them undesirable for specific applications. For instance, it is usually difficult or impossible to prepare aqueous solutions or dispersions of these resins having a solid content of over about 10 weight percent due to their tendency to form stiff gels. This difficulty is further enhanced by the slow rate at which the polymer dissolves in water. The rate of solution oftentimes is slowed by the tendency of the polymer particles to adhere to one another upon wetting. This occasionally results in the formation of gel lumps which dissolve at a much slower rate than the individual particles. While it is possible to minimize the formation of gel lumps through the careful regulation of the rate of addition of resin to water, or by the use of high-speed agitation, such practice is often undesirable. If agitation is effected under high shear conditions the mechanical shearing forces may cause molecular weight degradation. The effect of the reduced viscosity loss or molecular weight degradation is more prevalent in polymers having the higher molecular weights. Moreover, equipment limitations often make it impossible to agitate the water sufficiently to prevent formation of gel lumps, even with careful addition of polymer. This undoubtedly results in a delay of several hours while the dissolving operation is completed.

Furthermore, while the resinous olefin oxide polymers form a strong adhesive bond, they lack the ability to develop adhesiveness rapidly, that is, they lack the "quick tack" necessary for instantaneous bonding. Additionally, the low solids content of aqueous solutions of the polymers requires a multiplicity of applications in order to build a desired coating thickness, as for example, in treating paper products to apply a remoistenable adhesive or to render them grease-resistant.

Accordingly, one or more of the following objects will be achieved by the practice of the instant invention. It is an object of the present invention to provide novel compositions comprising olefin oxide polymers and rosinous materials which are readily dispersible in water and have outstanding adhesive characteristics, particularly in remoistenable films. A still further object of the present invention is to provide olefin oxide polymers which can be dissolved readily in an aqueous medium without viscosity loss or molecular weight degradation. Another object of this invention is to provide olefin oxide polymers which can be readily dissolved in an aqueous medium without the need for elaborate, high-speed, agitation equipment. A further object is to provide a process for treating olefin oxide polymers to render them more readily dispersible in water. Another object is to provide novel compositions comprising olefin oxide polymers and rosinous materials which impart grease-resistant properties when applied to or combined with cellulosic or cellulosic-containing materials. A further object of the present invention is to provide novel compositions comprising olefin oxide polymers and rosinous materials having a degree of extensibility greater than the olefin oxide polymer alone. A still further object of the instant invention is to provide a novel composition of an olefin oxide polymer comprised of at least 50 weight percent of ethylene oxide in copolymerized form with up to 50 weight percent of lower olefin oxides, such as, propylene oxide, butylene oxide, and the like, and a rosinous material. A further object is to provide a process for preparing the novel compositions of this invention. These and other objects of the present invention will readily become apparent to those skilled in the art in the light of the teachings herein set forth.

In one aspect, the present invention is directed to novel compositions comprising solid ethylene oxide polymers and copolymers, and rosinous materials which compositions have wide application in the paper, coatings and adhesives fields, particularly remoistenable adhesive films. The invention also encompasses a process for preparing and using the aforesaid novel compositions.

In accordance with the invention it has been found that by blending olefin oxide polymers, particularly ethylene oxide polymers and copolymers, with rosinous materials, novel compositions are obtained which exhibit properties not characteristic of the individual components. For example, it has been found that novel compositions of the instant inventions have high extensibility, improved solids dispersions in water, excellent adhesive characteristics in remoistenable films, as well as grease-resistant properties when applied to cellulosic-containing materials such as paper, paper products, and the like.

Although wood and gum rosin and their various derivatives are water-sensitive to some degree, they are considered to be largely water-insoluble. Moreover, the rosinous materials are also known to the brittle when used alone. Thus, it was indeed unexpected and surprising to find that when such materials, which were almost water-insoluble and had little distensibility, were blended with the olefin oxide polymers, the resulting blends were characterized by the ability to yield increased solids in water and a high degree of elongation. Thus, it was evident that blends of olefin oxide resins with rosinous materials produce compositions having properties which are not characterized by either ingredient alone.

The rosinous materials suitable for use in the practice of the instant invention comprise wood rosin and various acidic, polymeric, and ester derivatives thereof. These materials have been found to be compatible with olefin oxide polymers, do not impart any undesirable properties, and are relatively inexpensive to use. Illustrative rosinous materials include, among others, the various crude, refined, and distilled grades of wood rosin, wood rosin residue products, alkali soaps of wood rosin residue products, ester gums of wood rosin, i.e. the reaction product of wood rosin and polyhydric compounds, ester gums of wood rosin residue products, polymerized wood rosin, esters of polymerized wood rosin, hydrogenated wood rosin, esters of hydrogenated wood rosins, dehydrogenated rosin, the resinous terpene mono- and polybasic acids, such as abietic acid, and the like.

Various grades of wood rosin including such grades as K through WW are suitable for the purposes of this invention. Also applicable are the thermoplastic resins derived from pinewood which contains phenolic, aldehydic and etheric groups. Additionally, the ethylene glycol esters and diethylene glycol esters of the thermoplastic resins can be utilized. The polymerized rosins, their glycol, glyceryl, and glycerol esters, are also applicable. The synthetic resinous polybasic acid of terpene origin consisting essentially of 3-isopropyl-6-methyl-3,6-endoethylene also has been satisfactorily employed. Also applicable are the hydrogenated rosins.

In general, the olefin oxide polymer can be blended with the rosinous material in one of several ways. For example, blending can be accomplished by melting the ingredients and working them together in an internal mixer. However, in practice, the preferred method is to compound the polymer and rosinous material on a differential two-roll mill. The ingredients can first be preblended, then milled, or blended directly on the mill, by slowly adding the rosinous material as milling proceeds. Other methods of blending can equally as well be employed.

In addition to the aforesaid blending techniques, and particularly in those instances wherein the prime consideration is the rate at which the polymer dissolves in aqueous solutions without the formation of undesirable gel lumps, the polymer particles can be coated with the rosinous material rather than intimately mixed or blended therewith. By coating the solid polymer particles with the rosinous material which dissolves less rapidly than the polymer itself, it is possible to delay the initial softening of the polymer and thereby obtain a more uniform dispersion in water. Thereafter the dispersed polymer can dissolve at an even rate with a minimum formation of undesirable gel lumps.

In practice, the olefin oxide polymer can be coated with the rosinous material by forming a slurry of the polymer in a normally liquid, inert, organic solvent containing the rosinous material in solution. Solvents are chosen in which the rosinous material is soluble and the olefin oxide polymer essentially insoluble at ordinary temperatures. Thereafter, the solvent is evaporated leaving a coated polymer which is dry to the touch and free flowing.

Suitable inert, organic solvents which can be employed to effectively coat the olefin oxide polymer with the rosinous material include the saturated aliphatic hydrocarbons, ethers, ketones, esters, alcohols, and the like. Examples of such solvents are dibutyl ether, diethyl ether, acetone, methyl ethyl ketone, ethyl acetate (99 percent), methanol, ethanol (anhydrous), isopropanol (99 percent), hexane, cyclohexane, cycloheptane, methylcyclohexane, benzene, toluene, and the like. For economic considerations, the solvent employed should be relatively inexpensive, inert towards the olefin oxide polymer, and have a sufficiently low boiling point to permit rapid removal. However, any solvent which will dissolve the rosinous material without dissolving or otherwise adversely affecting the polymer, is applicable for the practice of the instant invention.

The concentration of the rosinous material in the blended product is not narrowly critical and, for most practical purposes, can range from about 1,, or lower, to about 40, and higher, weight percent based on the total weight of the blend. However, a concentration of from about 5 to about 25 weight percent is preferred. Concentrations above and below the aforesaid limits can also be employed.

In those instances wherein the olefin oxide polymer is coated with the rosinous material to enhance the rate of solution, concentrations of the rosinous material on the polymer should preferably range from about 1, and lower to about 25 weight percent, and higher, based on the total weight of the solid, uncoated polymer. The aforesaid concentrations of rosinous material on the polymer can usually be obtained in one treatment by employing a rosin concentration in the solvent used for applying the coating of from about 5 to about 25 weight percent, based on the weight of solvent.

It should be noted that the particular olefin oxide polymer and rosinous material employed will govern, to a large extent, the optimum conditions and concentration of ingredients for the successful practice of the invention.

The present invention is particularly suited for ethylene oxide polymers which have a reduced viscosity value of at least 0.5 and upwards to 75, and higher; or an aqueous viscosity at 25° C. of from 225 centipoises as measured at a 5 weight percent concentration, to 4000 centipoises, and higher, as measured at a 1 weight percent solution. The preferred resins for use in the instant invention are the ethylene oxide homopolymers and ethylene oxide copolymers comprised of at least 50 weight percent of ethylene oxide in copolymerized form with up to 50 weight percent of a lower olefin oxide which is selected from the group consisting of propylene oxide and butylene oxide.

By the term "reduced viscosity," as employed throughout the specification and appended claims, is meant a value obtained by dividing the specific viscosity by the concentration of the polymer in solution, the concentration being measured in grams of polymer per 100 milliliters of solvent at a given temperature. The term is regarded as a measure of molecular weight. The specific viscosity is obtained by dividing the difference between the viscosity of the solution and the viscosity of the solvent by the viscosity of the solvent. Unless stated otherwise, the reduced viscosities herein referred to are measured at a concentration of 0.2 gram of polymer in 100 milliliters of acetonitrile at 30° C. Also, unless otherwise stated herein, the reduced viscosity of olefin oxide polymer, particularly homopolymers of ethylene oxide and copolymers thereof, is a value in the range of at least 0.5 and upwards to 75, and higher.

The term "aqueous viscosity," as employed herein, refers to the viscosity of the stated concentration of polymer in water, as measured on a Model RVF Brookfield Viscometer using a No. 2 spindle operated at 6 revolutions per minute, unless otherwise stated. The viscosity is measured at ambient room temperatures, that is, about 24° C.

Due to their outstanding characteristics, the novel compositions of the instant invention are useful for a variety of applications. For example, blends of ethylene oxide and rosinous materials have been found particularly useful as adhesives. The compositions need only be admixed with water or other suitable solvent to form a paste, or they can be employed in combination with other known adhesives, which are compatible with the said compositions either as the major or minor constituent. Moreover, the novel compositions can be formulated into, or deposited on, sheets, films, tapes, and the like, wherein the compositions are ordinarily dry to the touch but possess excellent adhesive and "quick tack" properties when moistened. Thus, the novel compositions provide desirable moistenable adhesive when used, for example on envelopes, labels, stamps, and the like.

Suitable adhesive compositions of the present invention can be prepared by admixing (1) a composition comprising the olefin oxide polymer and from about 1 to about 40 weight percent of the rosinous material, based on the weight of said polymer, and (2) sufficient water, or other suitable solvent, to form a consistency necessary to provide the adhesive and "quick tack" properties. In practice, the solvent concentration will range from about 60 parts by weight, and lower, to about 90 parts by weight, and higher depending upon the consistency desired, means of application, and the like.

In those instances wherein the novel compositions have been formulated into sheets, films, tapes and the like, adhesiveness is obtained by merely moistening the surface. This feature is particularly useful, in sealing unit packages prepared from films of the olefin oxide polymer, where heat sealing may not be feasible.

Additionally, the mixtures of ethylene oxide polymers and rosinous materials impart grease resistant properties to paper and similar cellulosic-containing products. For example, by coating a commercial bond paper with a 10-mil wet thickness of 40 weight percent aqueous solution of the polymer and rosinous material (4:1 blend) and thereafter drying, a satiny finish was obtained and the paper was considered grease proof by accepted standards.

Coating compositions can be prepared by dissolving the aforementioned novel compositions in water or other suitable solvent and applying the solution or dispersion to the paper or other product being coated. The solids content of the solution will of course be dependent upon the desired coating thickness, the desired degree of penetration of the composition into the paper, as well as the number of applications of the solution. Drying can be effected by merely exposing the coated product to the air, or by placing the product in a forced-convection oven at from about 70° to about 100° C., or higher.

The following examples are illustrative:

*Example 1*

A 20 gram quantity of a pale colored distilled wood rosin was dissolved in 1000 cubic centimeters of acetone. A slurry was made in this solution with 80 grams of poly(ethylene oxide) having a minus 20 mesh particle size and a reduced viscosity in acetonitrile of 68.8 (which corresponds to a molecular weight of about 5,000,000). After the polymer was stirred for a few moments, the resulting slurry was poured into a large, flat glass dish, which was placed in the path of a continuously-moving stream of air passing through a laboratory hood. The slurry was stirred gently with a spatula from time to time. At the end of one hour, the acetone had evaporated, leaving the polymer dry to the touch and free-flowing.

For comparative purposes, two solutions were prepared using both the treated polymer and a control of untreated polymer. Each solution contained one percent by weight of the olefin oxide polymer. Solution was effected by weighing water and resin into a glass jar and placing the jar on a can roll at 90 revolutions per minute until solution was complete. The treated polymer dispersed in the water without formation of gel lumps and was completely dissolved in 3.5 hours. The untreated polymer formed numerous gel lumps of various sizes and did not dissolve completely until 40 hours had passed.

*Example 2*

A 20 gram quantity of a pale colored distilled wood rosin was dissolved in 1000 cubic centimeters of acetone. A slurry was made in this solution with 80 grams of poly(ethylene oxide) having a minus 10 mesh particle size. The polymer had a reduced viscosity in acetonitrile of 68.8 (which corresponds to a molecular weight of about 5,000,000). After the polymer was stirred for a few moments, the slurry was poured into a large, flat glass dish, which was placed in the path of a continuously-moving stream of air passing through a laboratory hood. The slurry was stirred gently with a spatula from time to time. At the end of one hour, the acetone had evaporated, leaving the polymer dry to the touch and free-flowing.

For comparative purposes, two solutions were prepared using both the treated polymer and a control of untreated polymer. Each solution contained one percent by weight of the olefin oxide polymer. Solution was effected by weighing water and resin into a glass jar and placing the jar on a can roll at 90 revolutions per minute until solution was complete. The treated polymer dispersed in the water without formation of gel lumps and was completely dissolved in 3.5 hours. The untreated polymer formed numerous gel lumps of various sizes and did not dissolve completely until 40 hours had passed.

*Example 3*

Mixtures of resinous poly(ethylene oxide), characterized by an aqueous viscosity in centipoises of 225–375 for a 5 weight percent aqueous solution, and wood rosin, grade FF, were prepared having the following weight ratios:

| Blend | Parts of Poly-(ethylene oxide) | Parts of Rosin |
| --- | --- | --- |
| A | 70 | 30 |
| B | 90 | 10 |
| C | 100 | |

The blends were pre-mixed as dry powders and then milled on a differential two-roll mill at 60–90° C. until a smooth, well-fluxed sheet was obtained. Press-polished plaques were prepared at 100° and at a pressure of 1500 pounds per square inch. Thereafter the plaques were aged for seven days at 23° C. and 50 percent relative humidity in a constant-temperature room to assure equilibrium moisture content. At the end of this time, strips were cut from each plaque, and the physical characteristics studied by means of an Instron Tensile Testing Instrument,[1] Table Model. The results are tabulated below in Table I:

TABLE I

| Blend | Average Tensile Strength at Yield [1] | Stiffness [2] | Percent Elongation |
| --- | --- | --- | --- |
| A | 894.4 | 25,412 | 1,255 |
| B | 1,298.6 | 30,545 | 930 |
| C | 1,996.6 | 47,512 | 856 |

[1] In pounds per square inch for loading speeds of 0.2–50 inches per minute.
[2] In pounds per square inch.

*Example 4*

Under ordinary circumstances, poly(ethylene oxide) resin forms only a 10 weight percent solids solution in water before showing signs of gelation. However, 50 grams of distilled water and 10 grams of small, irregular pieces of a milled blend of 80 parts by weight of poly(ethylene oxide) and 20 parts of wood rosin, grade FF, were placed together in a glass jar and put on a can roll at 90 revolutions per minute. At the end of two hours, a light, creamy, paste-like dispersion was obtained, with no evidence of gelatinous material. The solids content was 16.7 percent, or 13.4 percent poly(ethylene oxide) and 3.3 percent rosin.

*Example 5*

In order to demonstrate the adhesive ability of Blend A (Example 3), several round disks 1 7/16 inches in diameter were stamped from the press-polished plaque. A large fiber box 24" x 15" x 24", open at one end and weighing approximately 2 kilograms was obtained. Two of the disks were then moistened on one side with a thin film of tap water and were stuck to the back of the box, one near each end, about six inches from the top. The other side of each disk was then moistened, and the box was pressed against a painted laboratory wall, so that it was supported by the adhesive bond between disks and painted surface. This remained in position 16 hours, then 4 kilograms was gradually added to the box making a total of about 6 kilograms being supported. At this point, the paint on the laboratory was ruptured and allowed the box to fall. However, the paint and the disks were firmly bonded to each other.

[1] Instron Engineering Co.

What is claimed is:

1. A composition comprising solid poly(ethylene oxide) which has a reduced viscosity value of at least 1.0 as measured at a concentration of 0.2 gram of said poly (ethylene oxide) in 100 milliliters of acetonitrile at 30° C., and from about 1 to about 40 weight percent, based on the weight of said poly(ethylene oxide), of a rosinous material which is selected from the groups consisting of wood rosin, polymerized wood rosin, hydrogenated wood rosin, and dehydrogenated rosin.

2. A composition comprising a solid copolymer comprised of at least 50 weight percent of ethylene oxide in copolymerized form with up to 50 weight percent of a lower olefin oxide which is selected from the groups consisting of propylene oxide and butylene oxide, said copolymer having a reduced viscosity value of at least 1.0 as measured at a concentration of 0.2 gram of said copolymer in 100 milliliters of acetonitrile at 30° C.; and from about 1 to about 40 weight percent, based on the weight of said copolymer of a rosinous material which is selected from the groups consisting of wood rosin, polymerized wood rosin, hydrogenated wood rosin, and dehydrogenated rosin.

3. An adhesive composition comprising a mixture of (1) poly(ethylene oxide) which has a reduced viscosity value of at least 1.0 as measured at a concentration of 0.2 gram of said poly(ethylene oxide) in 100 milliliters of acetonitrile at 30° C., (2) from about 1 to about 40 weight percent, based on the weight of said poly(ethylene oxide), of a rosinous material which is selected from the groups consisting of wood rosin, polymerized wood rosin, hydrogenated wood rosin, and dehydrogenated rosin, and (3) sufficient water to impart an adhesive consistency to said mixture.

4. A process for rendering paper and paper products grease resistant which comprises coating said products with a solution containing (a) from 1 to 40 weight percent, based on said solution, of poly(ethylene oxide) which has a reduced viscosity of at least 1.0 as measured at a concentration of 0.2 gram of said poly(ethylene oxide) in 100 milliliters of acetonitrile at 30° C., (b) and from about 1 to about 25 weight percent, based on the weight of said poly(ethylene oxide), of a rosinous material which is selected from the groups consisting of wood rosin, polymerized wood rosin, hydrogenated wood rosin, and dehydrogenated rosin, and thereafter drying said coated product.

5. A paper product coated in accordance with the process of claim 4.

6. A composition comprising (1) an olefin oxide polymer selected from the group consisting of solid poly (ethylene oxide) and a solid copolymer comprised of at least 50 weight percent of ethylene oxide in copolymerized form with up to 50 weight percent of a lower olefin oxide which is selected from the group consisting of propylene oxide and butylene oxide, said olefin oxide polymer having a reduced viscosity value of at least 1.0 as measured at a concentration of 0.2 gram of said polymer in 100 milliliters of acetonitrile at 30° C.; and (2) from about 1 to about 40 weight percent, based on the weight of said polymer, of a rosinous material which is selected from the groups consisting of wood rosin, polymerized wood rosin, hydrogenated wood rosin, and dehydrogenated rosin.

7. An adhesive composition comprising a mixture of (1) an olefin oxide polymer selected from the group consisting of solid poly(ethylene oxide), and a solid copolymer comprised of at least 50 weight percent of ethylene oxide in copolymerized form with up to 50 weight percent of a lower olefin oxide which is selected from the group consisting of propylene oxide and butylene oxide, said olefin oxide polymer having a reduced viscosity value of at least 1.0 as measured at a concentration of 0.2 gram of said polymer in 100 milliliters of acetonitrile at 30° C.; (2) from about 1 to about 40 weight percent, based on the weight of said poly(ethylene oxide), of a coating of a rosinous material which is selected from the groups consisting of wood rosin, polymerized wood rosin, hydrogenated wood rosin, and dehydrogenated rosin; and (3) sufficient solvent in which said olefin oxide polymer is soluble to impart an adhesive consistency to said mixture.

References Cited by the Examiner
UNITED STATES PATENTS

| | | | |
|---|---|---|---|
| 1,942,146 | 1/1934 | Kollek et al. | 260—24 |
| 2,187,006 | 1/1940 | Alvarado et al. | 260—2 |
| 2,948,694 | 8/1960 | Reed | 260—24 |
| 3,100,750 | 8/1963 | Bailey et al. | 260—2 |

FOREIGN PATENTS

| | | |
|---|---|---|
| 559,700 | 7/1958 | Canada. |

WILLIAM H. SHORT, *Primary Examiner.*

MILTON STERMAN, LOUISE P. QUAST, *Examiners.*

J. ZIEGLER, S. N. RICE, *Assistant Examiners*